United States Patent [19]

Glennon

[11] Patent Number: 4,564,895
[45] Date of Patent: Jan. 14, 1986

[54] NEUTRALLY CLAMPED PWM HALF-BRIDGE INVERTER

[75] Inventor: Timothy F. Glennon, Rockford, Ill.

[73] Assignee: Sundstrand Corporation, Rockford, Ill.

[21] Appl. No.: 531,037

[22] Filed: Sep. 12, 1983

[51] Int. Cl.$^4$ .......................................... H02M 7/797
[52] U.S. Cl. ...................................... 363/41; 363/132
[58] Field of Search ...................... 363/39, 40, 41, 131, 363/132, 135, 136, 17

[56] References Cited

U.S. PATENT DOCUMENTS

| | | | |
|---|---|---|---|
| 3,286,155 | 11/1966 | Corey | 363/41 |
| 3,641,417 | 2/1972 | Gyugyi | 363/39 |
| 3,864,619 | 2/1975 | Tanaka et al. | 363/135 |
| 3,964,086 | 6/1976 | Gritter | 363/135 |
| 4,060,757 | 11/1977 | McMurray | 363/135 |
| 4,339,791 | 7/1982 | Mitchell | 363/41 |
| 4,443,841 | 4/1984 | Mikami et al. | 363/41 |
| 4,463,400 | 7/1984 | Paice et al. | 363/35 |

OTHER PUBLICATIONS

*New Format Step-Wave Output Inverter,* Akira Naniwae, Isao Takahashi, Yasunobu Akagi, Nagaoka Institute of Science and Technology.

*Primary Examiner*—William H. Beha, Jr.
*Assistant Examiner*—Jeffrey Sterrett
*Attorney, Agent, or Firm*—Wood, Dalton, Phillips, Mason & Rowe

[57] ABSTRACT

A neutrally clamped pulse width modulated inverter. The inverter includes a bidirectional switch which, when turned on, clamps the voltage applied to the inverter output filter to neutral or ground to provide a pulse width modulated waveform having a voltage swing of one-half of the rail-to-rail voltage of the inverter over each half cycle of the output. The bidirectional switch also provides a path to ground for any regenerative current flowing from the load so as to enable the regenerative current capacity of the inverter power supply to be reduced.

2 Claims, 10 Drawing Figures

NEUTRALLY CLAMPED PWM HALF-BRIDGE INVERTER

TECHNICAL FIELD

The present invention relates to a pulse width modulated inverter and more particularly to a neutrally clamped pulse width modulated inverter.

BACKGROUND OF THE ART

A known pulse width modulated (PWM) inverter includes a center tapped power supply with positive and negative terminals, the center tap being connected to neutral or ground. The positive and negative terminals are connected to a low pass output filter through respective switches which may be transistors or the like. The inverter switches are controlled to alternately conduct current to the output filter, the switches providing a pulse width modulated waveform to the filter, which in response thereto, provides an AC output which is applied to a load.

The pulse width modulated waveform applied to the output filter typically has a voltage swing of the rail-to-rail voltage of the inverter power supply over each half-cycle of the output. In order to provide the desired AC output, a very large output filter is typically required to accommodate the large rail-to-rail voltage swing of the pulse width modulated waveform from the inverter. Where the inverter is to be used in applications where weight is critical, such as on an aircraft, the use of such large filters is extremely undesirable.

Another problem with known PWM inverters is their capacity to accept regenerative currents. In applications where the load is reactive, the power supply of the inverter typically includes capacitors for accepting all regenerative currents. Even with a near unity power factor load, if the load current is continuous because of the output filter, the capacitors must still accept regenerative currents. The power supply capacitors must therefore be quite large, increasing the weight of the inverter which is undesirable for many applications.

DISCLOSURE OF THE INVENTION

In accordance with the present invention, the disadvantages of prior PWM inverters as discussed above have been overcome.

The PWM inverter of the present invention includes a bidirectional switch which, when turned on, clamps the voltage applied to the inverter output filter to neutral or ground to provide a pulse width modulated waveform having a voltage swing of only one-half of the rail-to-rail voltage of the inverter over each half-cycle of the output.

The bidirectional switch, when turned on, also provides a path to ground for any regenerative current flowing from the load so as to enable the regenerative current capacity of the power supply to be reduced.

The bidirectional switch of the present invention allows the attenuation requirement of the inverter output filter to be reduced by at least 50% since the voltage swing of the pulse width modulated waveform is only one-half of the rail-to-rail voltage of the inverter. Further, the power supply capacitors may be substantially reduced in size since they need not accept all of the regenerative current. The reduction in size of the output filter and power supply capacitors results in an inverter which is sufficiently lightweight for applications where weight is critical.

These and other objects and advantages of the invention, as well as details of an illustrative embodiment, will be more fully understood from the following description of the drawings.

BEST MODE FOR CARRYING OUT THE INVENTION

Figure 1:
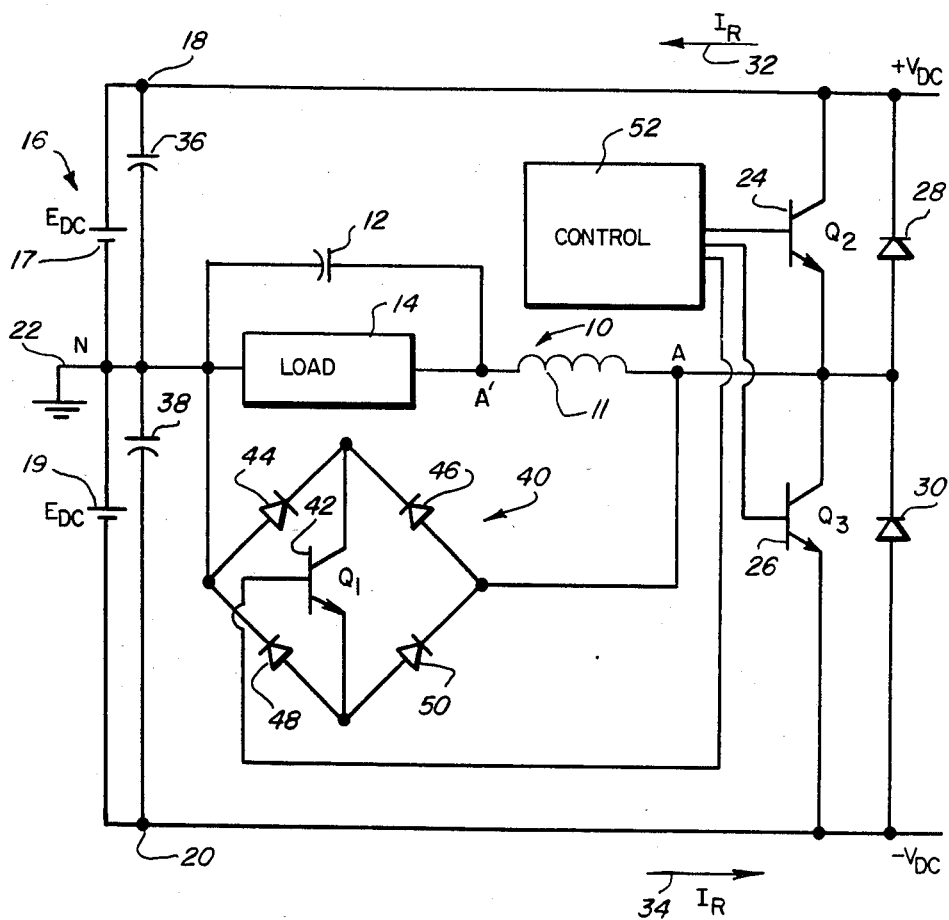
FIG. 1 is a schematic diagram of one phase of the neutrally clamped PWM inverter of the present invention.

The inverter, as shown in FIG. 1, provides a pulse width modulated waveform at point A to a low pass output filter 10 which is comprised of an inductor 11 and capacitor 12, the filter having an AC output at point A' which is applied to a load 14. The inverter includes a center tapped power supply generally designated 16 having a DC source 17 connected to terminal 18 for providing a positive DC voltage, $+V_{DC}$, and having a DC source 19 connected to a terminal 20 to provide a negative DC voltage, $-V_{DC}$, the center tap 22 being connected to neutral or ground. The output filter 10 and load 14 are coupled between the neutral center tap and the positive and negative power supply terminals 18 and 20 through a pair of series connected transistors 24 and 26 which are controlled to provide the pulse width modulated waveform at point A. Diodes 28 and 30 are connected in parallel across the respective transistors 24 and 26 to provide a path for regenerative currents flowing in the respective directions of the arrows 32 and 34. The power supply 16 is provided with a pair of capacitors 36 and 38 which are connected in parallel with sources 19 and 20, the capacitors accepting a small amount of regenerative current as discussed below.

The inverter includes a bidirectional switch 40 which is coupled across the output filter 10 to provide a short circuit thereacross, clamping the voltage at point A to neutral or ground whenever the switch is turned on. The bidirectional switch 40 includes a transistor 42 and diodes 44, 46, 48 and 50 connected in a bridge. The collector of the transistor 42 is connected between the cathodes of diodes 44 and 46, the diode 44 having its anode connected to the neutral center tap 22 and the diode 46 having its anode connected to point A. The emitter of the transistor 42 is connected between the anodes of the diodes 48 and 50, the diode 48 having its cathode connected to the neutral center tap 22 and the diode 50 having its cathode connected to point A. When the bidirectional switch 40 is turned on by the application of base current to the transistor 42, the switch can conduct current in either a first direction through the diode 44, transistor 42 and diode 50 or a second direction through the diode 46, transistor 42 and diode 48 to provide a short across the output filter 10.

Figure 2:
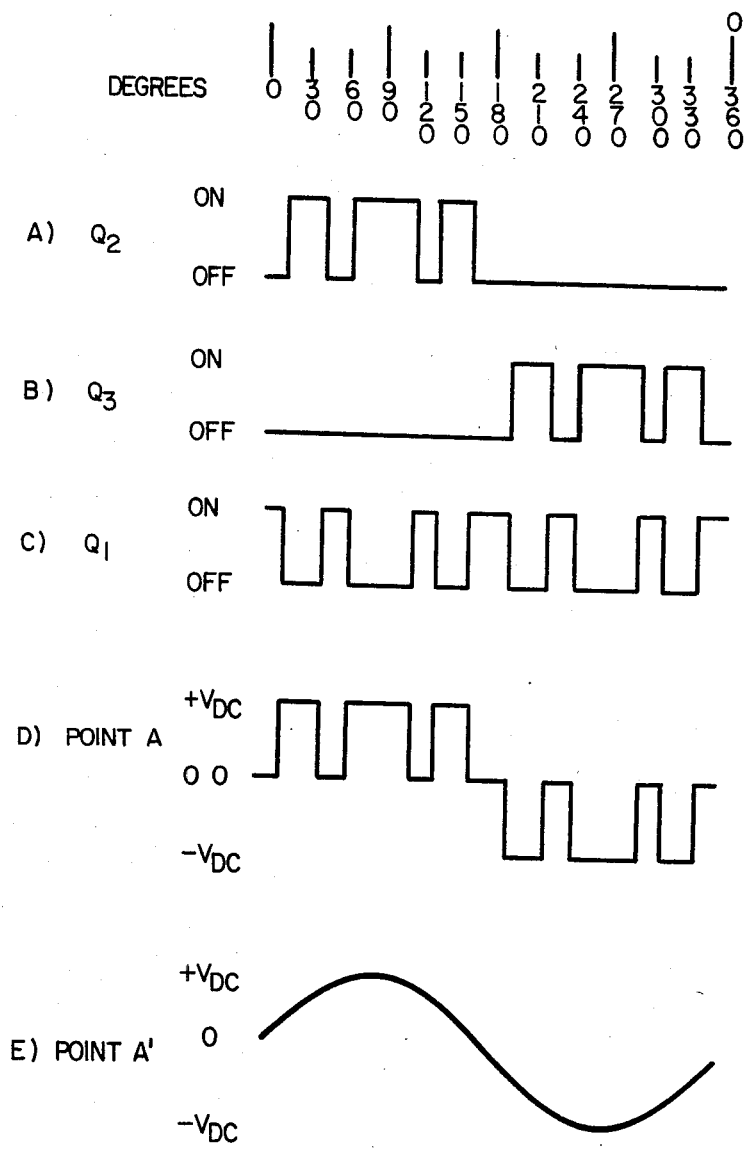
FIGS. 2A–E are waveforms illustrating the operation of the neutrally clamped PWM inverter of FIG. 1.

The inverter also includes a controller 52 for turning each of the transistors 24, 26 and 42 on and off so as to produce a pulse width modulated waveform at point A which will provide the desired AC output from the filter 10 at point A' to be applied to the load. The controller 52 outputs a plurality of control signals to the base of each of the transistors 24, 26 and 42 to turn the transistors on and off. An example of the respective waveforms applied to the transistors 24, 26 and 42 is shown in FIGS. 2A–2C. From these waveforms it is seen that during the period of 0°–180°, the transistor 24 is alternately turned on and off by the waveform of FIG. 2A; the transistor 26 is turned off; and the transistor 42 is turned on by the waveform of FIG. 2C whenever the transistor 24 is turned off. Similarly, during the period of 180°–360°, the transistor 26 is alternately turned on and off by the waveform of FIG. 2B; the transistor 24 is turned off; and the transistor 42 is turned on by the waveform of FIG. 2C whenever the transistor 26 is turned off.

When the transistor 24 is turned on during the formation of the positive half-cycle of the AC output at point A', the voltage at point A is approximately equal to the positive DC source voltage, $+V_{DC}$, ignoring any voltage drop across the transistor. When the transistor 24 is turned off and the transistor 42 is turned on, the bidirectional switch 40 forms a short circuit across the filter 10, current flowing into point A through the diode 50, the transistor 42 and the diode 44 from the neutral center tap 22, clamping the voltage at point A to approximately neutral or ground. The transistors 24 and 42 are alternately turned on to provide at point A a plurality of positive pulses such as the three pulses illustrated in FIG. 2D, to form the positive half-cycle of the AC output at point A' as shown in FIG. 2E. Because of the neutral clamp provided by the bidirectional switch 40, each pulse of the pulse width modulated waveform at point A has a voltage swing of only zero to $+V_{DC}$ over the positive half-cycle of the AC output.

When the transistor 26 is turned on during the formation of the negative half-cycle of the AC output at point A', the voltage at point A is approximately equal to the negative DC voltage, $-V_{DC}$, again ignoring any voltage drop across the transistor. When the transistor 26 is turned off and the transistor 42 is turned on, the bidirectional switch 40 forms a short circuit across the filter 10, current flowing through the diode 46, the transistor 42 and the diode 48, clamping the voltage at point A to neutral or ground. The transistors 26 and 42 are alternately turned on to provide, at point A, a plurality of negative pulses such as the three pulses illustrated in FIG. 2D to form at point A' the negative half-cycle of the AC output shown in FIG. 2E. Because of the neutral clamp provided by the switch 40, each pulse of the pulse width modulated waveform at point A has a voltage swing of zero to $-V_{DC}$ over the negative half-cycle of the AC output.

Figure 3:
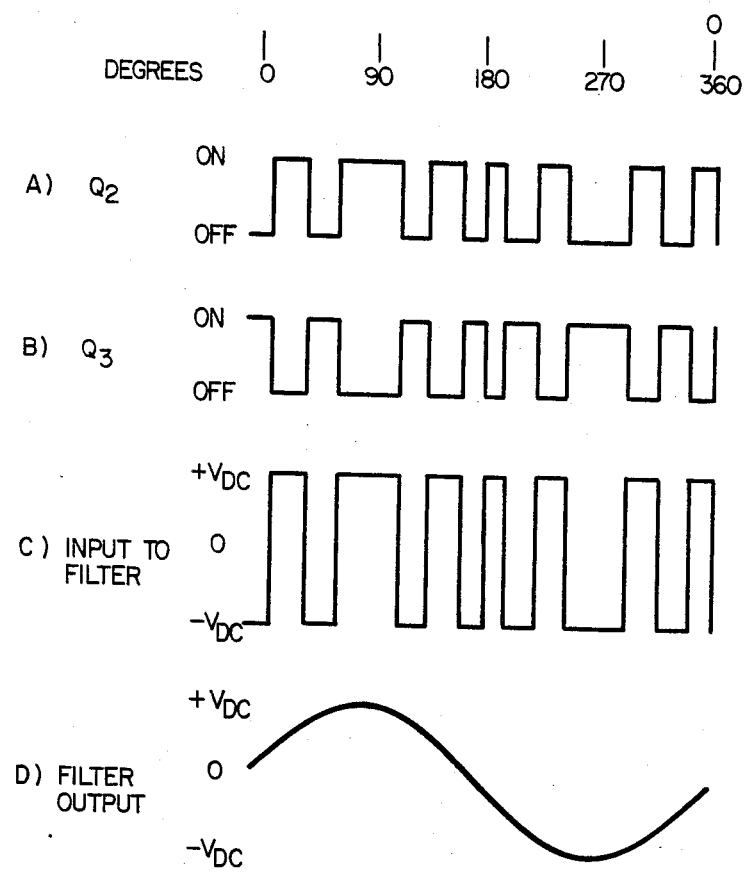
FIGS. 3A–D are waveforms illustrating the operation of prior art PWM inverters.

Prior art PWM inverters are similar to the inverter shown in FIG. 1 but do not include the bidirectional switch 40. Such prior art inverters are controlled by the waveforms shown in FIGS. 3A–B wherein the two inverter transistor switches Q2 and Q3 are alternately turned on over each half-cycle, from 0°–360°, so that one transistor is always on while the other is off. Controlling the two transistor switches as shown in FIGS. 3A–B results in a pulse width modulated waveform, as shown in FIG. 3C, having a rail-to-rail voltage swing of $+V_{DC}$ to $-V_{DC}$ over each half-cycle of the sine wave output as shown in FIG. 3D.

The bidirectional switch 40 of the present invention, when turned on, clamps the voltage at the input to the filter 10, point A, to neutral or ground so as to reduce the voltage swing at point A to one-half of the rail-to-rail voltage over each half-cycle of the output. Because the voltage swing of the pulse width modulated waveform provided at point A is reduced over each half-cycle of the output, the attenuation requirement of the output filter 10 may be reduced by at least 50%.

The bidirectional switch 40 also provides a path to neutral or ground for any regenerative current flowing during the time the bidirectional switch is turned on. With an inductive load having a lagging power factor, regenerative current flows from the load in the direction of the arrow 32 during the 0°–90° portion of the output waveform at point A'. Regenerative current also flows from the load in the direction of the arrow 34 during the 180°–270° portion of the output waveform. The bidirectional switch 40, when turned on, provides a path to ground for any regenerative current flowing from the load so that for an inductive load, the power supply capacitor 36 must accept regenerative current only when during the 0°–90° portion of the output when the transistor 24 is on and the capacitor 38 must accept regenerative current only during the 180°–270° portion of the output waveform when the transistor 26 is on. Since the capacitors 36 and 38 do not accept all of the regenerative current, they may be substantially reduced in size.

The reduction in size of the output filter 10 and the capacitors 36 and 38 due to the operation of the bidirectional switch 40 results in a lightweight inverter which may be used in applications where weight is a critical factor, such as in an aircraft or the like. The neutrally clamped PWM inverter, although shown having a pulse width modulated waveform with only three pulses per half-cycle, may be used to provide any desired number of pulses per half-cycle. Further, although the inverter is shown for only a single phase, the neutrally clamped PWM inverter will work for any number of phases.

I claim:

1. In a pulse width modulated inverter having
    a DC source with positive and negative terminals and a neutral center tap,
    first and second switches connected in series between said terminals and having a junction between the switches, and a filter connected from said junction to said neutral center tap, a load being connectable to the filter, the improvement comprising:
    a bidirectional switch connected across said filter from said junction to said neutral center tap; and
    means for controlling conduction of said first, second and bidirectional switches, the first and second switches conducting for alternate half cycles with a pulse width modulated on and off waveform, and said bidirectional switch conducting only when said first and second switches are both off to clamp said junction to said neutral center tap for current flow of either direction in the load.

2. The inverter of claim 1 in which said bidirectional switch is a diode bridge having first diagonal terminals connected with said junction and neutral center tap and second diagonal terminals having a switch transistor connected thereacross.

* * * * *